Nov. 17, 1970  G. L. POPE  3,540,245
TAMPER-PROOF LOCK NUT
Filed May 24, 1968  2 Sheets-Sheet 1
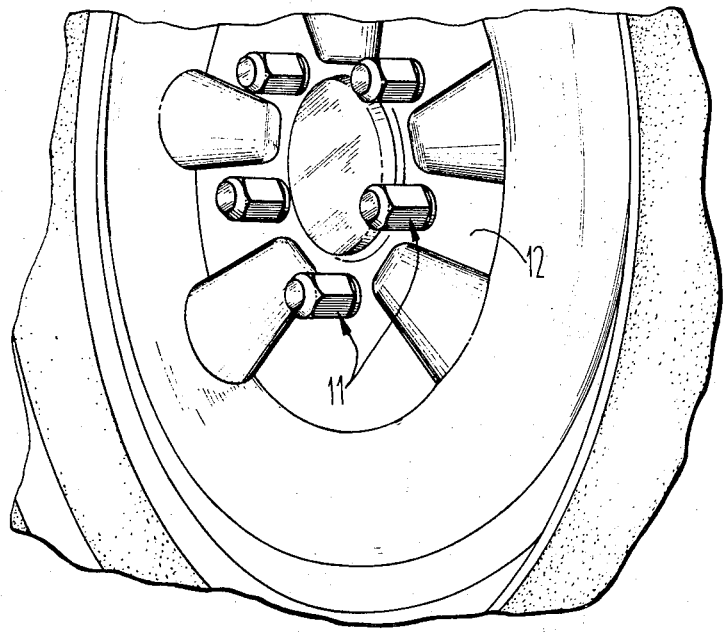
Fig_1
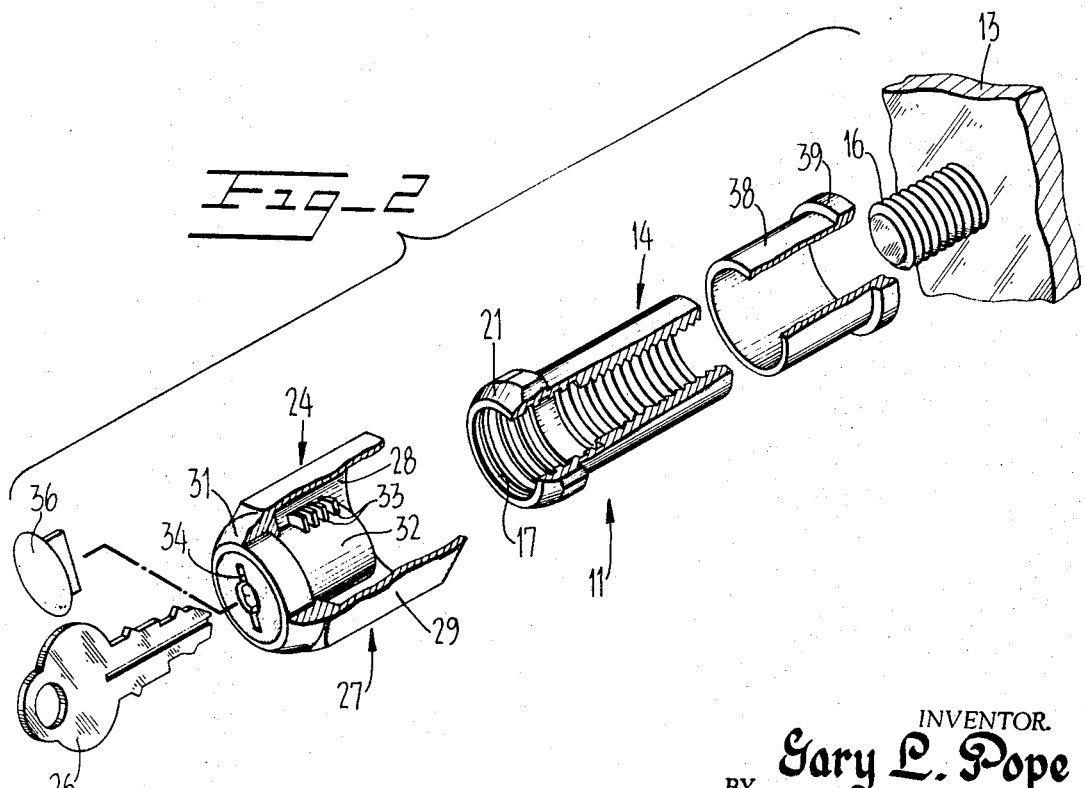
Fig_2
INVENTOR.
Gary L. Pope
BY
Gardner & Zimmerman
ATTORNEYS Nov. 17, 1970 G. L. POPE 3,540,245
TAMPER-PROOF LOCK NUT
Filed May 24, 1968 2 Sheets-Sheet 2
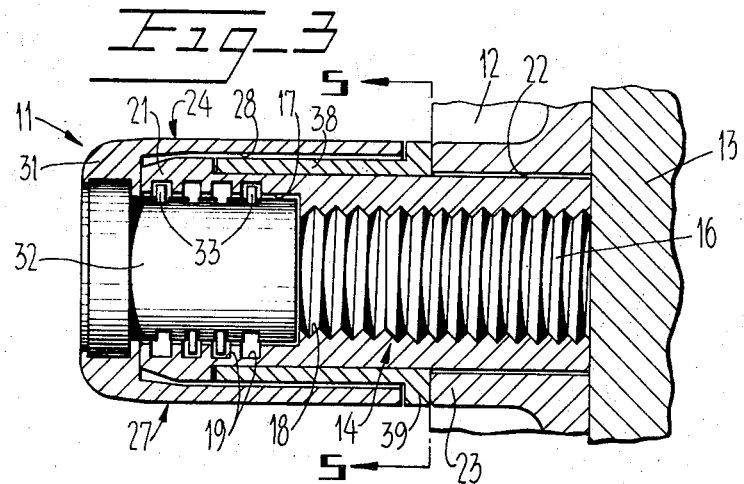
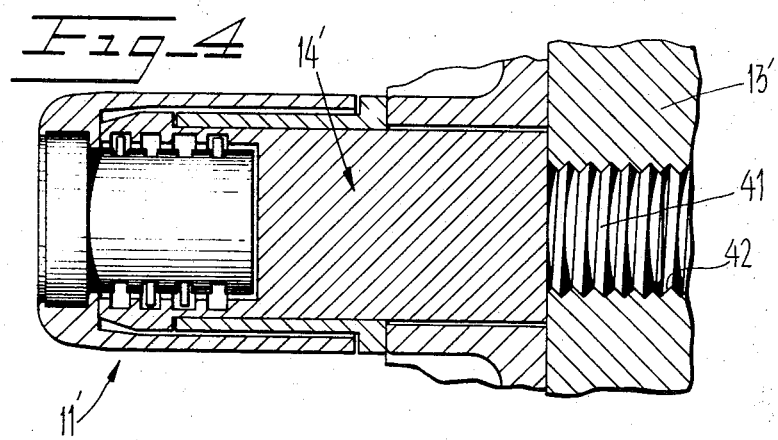
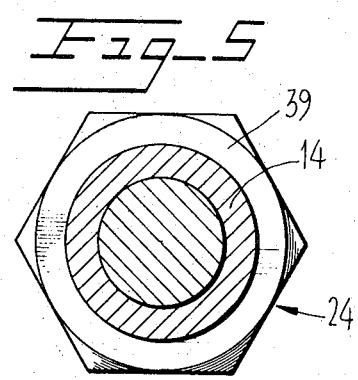
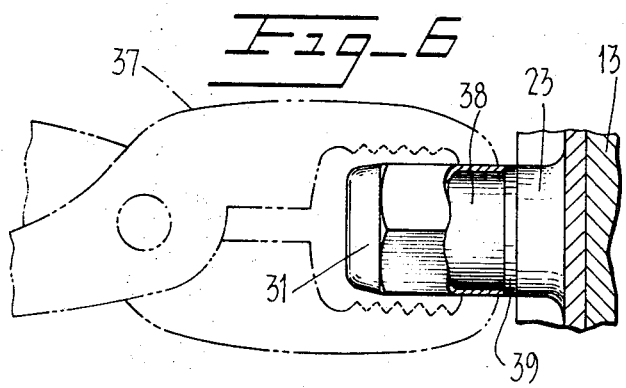
INVENTOR
Gary L. Pope
Gardner & Zimmerman
ATTORNEYS

United States Patent Office 3,540,245
Patented Nov. 17, 1970

3,540,245
TAMPER-PROOF LOCK NUT
Gary L. Pope, 711 Cedar St., Lafayette, Calif. 94549
Filed May 24, 1968, Ser. No. 731,974
Int. Cl. F16b *41/00*
U.S. Cl. 70—231                                8 Claims

ABSTRACT OF THE DISCLOSURE

A nut assembly of the type including a lock nut member removable by means of a key to afford access to the nut proper for removal from the bolt. The lock nut may be employed in any application that is desired to prevent surreptitious removal of a nut from a bolt, and is particularly useful as a lug nut of a motor vehicle wheel assembly. The lock nut is so arranged that tampering with the lock member will not result in removal of the nut without use of the key.

BACKGROUND OF THE INVENTION

Various lock nuts have been devised heretofore for use as the lug nuts of a motor vehicle wheel assembly, and elsewhere, to prevent surreptitious removal of the nuts, and thus of the wheel, or other element thereby secured in place. Typically, such a lock nut has been provided in the form of an assembly including a nut element having a hexagonal, or other polygonal periphery for facilitating securance of the nut element to a bolt by means of a wrench or the like, and a key operated lock member adapted to be placed over the nut element and locked in an encompassing position wherein the lock member is rotatable about the nut element, but fixed in longitudinal position relative thereto. More particularly, the lock member is generally provided as a tubular body having a cylindrical interior and hexagonal periphery with a key actuated tumbler drum projecting coaxially inward from one end of the body in radially inwardly spaced relation to the interior thereof. The drum carries a plurality of tumblers which are retractable in response to insertion of the key into a slot thereof, and such tumblers are engageable in annular grooves in the interior wall of the nut element when the hexagonal peripheral wall thereof is encompassed by the cylindrical interior of the body of the lock member. Thus, the tumblers, in engaging the grooves, prevent longitudinal translation of the lock member relative to the nut element to lock the lock member in position on the nut element while permitting rotation of the former relative to the latter.

With existing lock nuts of the foregoing type, it is hence the intent that turning of the lock member does not effect turning of the nut element, and that it is necessary to insert the key to facilitate removal of the lock member in order to expose the nut element for turning. However, it will be appreciated that a problem exists in that such conventional lock nuts are not tamper-proof. More specifically, it is possible to crimp the body of the lock member sufficiently to snugly frictionally engage or bind the cylindrical interior thereof against the apex edges of the periphery of the nut element whereby turning of the lock member also effects turning of the nut element.

SUMMARY OF THE INVENTION

The present invention relates to a lock nut assembly which is tamper-proof in that the lock member thereof cannot be crimped against the periphery of the nut element whereby binding therebetween is prevented. As a result, a rotatable relation is maintained between the lock member and nut element such that the latter cannot be turned until exposed by removal of the former.

In the accomplishment of the foregoing, the lock nut assembly generally includes a nut element having a cylindrical periphery with an outwardly stepped hexagonal or other polygonal portion at one end, a cylindrical sleeve concentrically disposed upon the cylindrical periphery of the nut element in abutting relation to the hexagonal portion, and a lock member having a tubular body provided with a cylindrical interior and a key actuated tumbler drum projecting coaxially inward from one end thereof, the cylindrical interior of the body coaxially engaging the sleeve and tumblers projecting radially from the drum engaging annular grooves in the interior wall of the nut element. Crimping of the tubular body of the lock member thus merely results in engaging the cylindrical interior thereof against the cylindrical periphery of the sleeve, not against the hexagonal end portion of the nut element. Binding between the lock member and nut element is consequently prevented, and turning of the nut element by turning of the lock member cannot be effected.

BRIEF DESCRIPTION OF THE DRAWINGS

FIG. 1 is a perspective view of a motor vehicle wheel assembly employing lock nuts in accordance with the present invention as lug nuts.

FIG. 2 is an exploded perspective view of a lock nut in accordance with the present invention.

FIG. 3 is a longitudinal sectional view of the nut in accordance with the present invention.

FIG. 4 is a view similar to FIG. 3 of a modified form of the invention embodying a lock bolt in accordance therewith.

FIG. 5 is a sectional view taken at line 5—5 of FIG. 3.

FIG. 6 is a side elevational view, with portions broken-away of a lock nut or bolt in accordance with the invention illustrating the manner in which tampering therewith is prevented.

DETAILED DESCRIPTION OF THE PREFERRED EMBODIMENTS

Referring now to the drawings in detail, particularly FIG. 1 thereof, the lock nut 11 of the present invention will be seen to be illustrated in its use as a lug nut of a motor vehicle wheel assembly for securing a wheel 12 to an axle hub 13. It will be appreciated, however, that the lock nut 11 may be employed in other environments where it is desired to prevent surreptitious removal of the nut and the element secured in place thereby. For example, lock nuts in accordance with the present invention may be advantageously employed to secure a transmission to an engine block, etc., to prevent surreptitious removal of the transmission or other secured element. It should be noted, moreover, that although the invention is for the most part described hereinafter with reference to a lock nut, the inventive principles apply equally as well to a lock bolt. Therefore, the invention might more appropriately be stated as relating to a lock fastener, i.e., a nut or bolt.

Considering now the lock nut 11 in greater detail, particularly with reference to FIGS. 2 and 3, the nut will be seen to include a fastener element, in the present case a nut element 14, adapted to threadably engage a lug bolt 16 projecting outwardly from the axle hub 13. A first end of the nut element is formed with a central circular recess 17 which communicates with an internally threaded bore 18 extending coaxially through the remainder of the nut element. The wall of the recess 17 is provided with a plurality of longitudinally spaced annular grooves 19 for a purpose subsequently described. The internally threaded bore 18 is such as to threadably engage the bolt 16. The periphery of the nut element is cylindrical and provided with an outwardly stepped hexagonal, or other polygonal, portion 21 at its first end to facilitate gripping by a wrench, or equivalent tool. Thus, the nut element may be inserted through the bore 22 of a boss 23 on the wheel 12 and threaded and tightened upon the bolt 16 by means of a wrench gripping the hexagonal portion 21 to thereby secure the wheel to the hub 13.

In order to prevent surreptitious removal of the nut element from the bolt, the nut element is encompassed by a lock member 24 which is rotatable relative to the nut element, but fixed in a locked longitudinal position with respect thereto. The lock member is actuatable by means of a key 26 to release same for removal from the nut element. The lock member preferably comprises a tubular body 27 having a cylindrical interior wall 28 and hexagonal, or other polygonal periphery 29. One end of the body is formed with an annular inwardly flared flange 31 mounting a key actuated tumbler drum 32 which projects coaxially into the body in inwardly spaced relation to its interior wall 28. First and second diametrically opposed sets of tumblers 33 project radially outward from the drum, and such tumblers are retractable in response to insertion of the key 26 into a slot 34 provided in the outer end wall of the drum.

In the normal position of the lock member 24, the body 27 is coaxially disposed about the nut element 14 while the tumbler drum 32 is coaxially disposed within the nut element recess 17 with the tumblers 33 engaging the grooves 19. The tumblers in engaging the grooves permit rotation of the lock member relative to the nut element while locking the lock member in fixed longitudinal position relative thereto. Consequently, rotation of the lock member does not effect rotation of the nut element. In order to remove the nut element it is necessary to expose same by removing the lock member. In this regard the key 26 is inserted into the slot 34 to retract the tumblers 33 into the drum 32 whereupon the lock member may be withdrawn longitudinally from the nut element. When the lock member is in its normal locked position encompassing the nut element, a plug 36 is preferably engaged in the slot 34 to prevent moisture, dirt, etc. from entering same and detrimentally affecting actuation of the tumblers.

It will be appreciated that to the extent thus far described, the lock nut 11 is generally conventional. However, with existing lock nuts the entire periphery of the nut element is typically hexagonal rather than only the end portion 21 as provided with the lock nut 11 in accordance with the present invention. Existing lock nuts have been susceptible to tampering in that it has been possible to crimp the body of the lock member into snug tight fitting or binding relation with the apex edges of the hexagonal periphery of the nut element with the aid of a pair of pliers 37, or the like, in the manner depicted in FIG. 6. The lock member does not then rotate relative to the nut element, and upon turning of the lock member the nut element is also turned.

In accordance with the particularly salient aspects of the present invention, the foregoing problem is obviated by means of a sleeve 38 which serves to prevent crimping of the lock member body 27 into binding relation with the nut element 14. More particularly, the sleeve 38 is cylindrical and provided with an outwardly flared annular flange 39 at one end thereof. The sleeve is coaxially disposed upon the cylindrical periphery of the nut element 14 with its second end abutting the outwardly stepped hexagonal portion 21. The thickness of the wall of the sleeve is substantially equal to the outwardly stepped dimension of the hexagonal portion such that when the sleeve is coaxially disposed upon the nut element the sleeve periphery is substantially flush with the periphery of the hexagonal portion. The body 27 of lock member 24 is coaxially disposed upon the sleeve with its free end abutting the flange 39.

It will thus be appreciated that any attempt to crimp the lock member body 27 into binding engagement with the nut element 14 in the manner illustrated in FIG. 6 is prevented by the sleeve 38. The cylindrical interior wall 28 of the body is merely engaged with the cylindrical periphery of the sleeve, rather than being crimped into tight binding relation with the apex edges of hexagonal portion 21 of the nut element. Crimping of the lock member body in the immediate vicinity of the hexagonal portion is prevented due to the structural strength of the body in such region afforded by the close proximity of the flange 31. Hence, a rotatable relation between the lock member and nut element is maintained despite any attempt to tamper with same.

Although the invention has been hereinbefore described with respect to a lock nut 11 including a nut fastener element 14, as previously noted the principles apply equally as well to a lock bolt 11 including a bolt fastener element 14 as shown in FIG. 4. In this regard the respective components are identical to those previously described relative to nut 11 with the exception that bolt element 14' is provided with an integral coaxially projecting bolt 41 in place of the internally threaded bore 18 of nut element 14. The bolt 41 is adapted to threadably engage a tap 42 provided in an axle hub 13', or the like.

I claim:

1. A tamper-proof lock fastener comprising a fastener element having a polygonal portion at a first end thereof for gripping by a wrench or the like; a removable lock member having a tubular body coaxially disposed on said fastener element and encompassing said polygonal portion thereof, said removable lock member including lock means which in a locked position maintain said body in a fixed longitudinal orientation relative to said fastener element encompassing the polygonal portion thereof while permitting rotation between said body and said fastener element, and which in a released position permits said locking member to be longitudinally removed from said fastener element to expose said polygonal portion thereof; and a sleeve disposed upon said fastener element rearwardly of said polygonal portion and rotatable with respect to said fastener element, said sleeve being interposed between said fastener element and said tubular body to prevent inward crimping of the tubular body from causing the interior surface thereof to bind against said polygonal portion of said fastener element and inhibit free rotation of said lock member on said fastener element.

2. A tamper-proof lock fastener according to claim 1, further defined by said fastener element having a recess extending coaxially into said first end thereof with the wall of said recess having a plurality of longitudinally spaced annular grooves, and said lock means being a key actuated tumbler drum projecting coaxially into the interior of said body from an end thereof and inwardly radially spaced from the interior wall of said body, said drum coaxially disposed in said recess and having a plurality of radially projecting tumblers engaging said grooves, said tumblers being retracted into said drum in response to insertion of a key into a slot extending inward from an outer end thereof.

3. A tamper-proof lock fastener according to claim 1, further defined by said sleeve having a first end abutting said polygonal portion and an outwardly flared annular flange at the second end thereof, said body of said lock member having a first end abutting said flange.

4. A tamper-proof lock fastener according to claim 1, further defined by said fastener element having an internally threaded bore extending coaxially into the second end thereof.

5. A tamper-proof lock fastener according to claim 1, further defined by said fastener element having a bolt projecting coaxially from the second end thereof.

6. A tamper-proof lock fastener according to claim 3, further defined by said fastener element having a recess extending coaxially into said first end thereof with the wall of said recess having a plurality of longitudinally spaced annular grooves, said lock member body having an upwardly flared annular flange at the second end thereof, and said lock means comprising a key actuated tumbler drum mounted on said flange of said body and projecting coaxially thereinto in radially inwardly spaced relation to the interior wall thereof, said drum coaxially disposed in said recess and having a plurality of radially projecting tumblers engaging said groves, said tumblers being retracted into said drum in response to insertion of a key into a slot extending inward from an outer end thereof.

7. A tamper-proof lock fastener according to claim 6, further defined by said fastener element having an internally threaded bore extending coaxially into the second end thereof.

8. A tamper-proof lock fastener according to claim 6, further defined by said fastener element having a bolt projecting coaxially from the second end thereof.

References Cited

UNITED STATES PATENTS

| 1,625,901 | 4/1927 | Lay | 70—232 |
| 2,322,347 | 6/1943 | Churchman | 70—232 |
| 2,778,215 | 1/1957 | Redmond | 70—231 |

FOREIGN PATENTS

| 310,932 | 2/1930 | Great Britain. |

MARVIN A. CHAMPION, Primary Examiner

R. L. WOLFE, Assistant Examiner